(12) United States Patent
Tollis et al.

(10) Patent No.: US 9,981,556 B2
(45) Date of Patent: May 29, 2018

(54) MOLD AND FOLD VEHICLE DISPLAY ASSEMBLY

(71) Applicant: Continental Automotive Systems, Inc., Auburn Hills, MI (US)

(72) Inventors: Daniel P. Tollis, Novi, MI (US); Michael E. Carrel, Northville, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days. days.

(21) Appl. No.: 14/955,393

(22) Filed: Dec. 1, 2015

(65) Prior Publication Data

US 2017/0151874 A1    Jun. 1, 2017

(51) Int. Cl.
| | |
|---|---|
| *B60K 37/02* | (2006.01) |
| *B60K 35/00* | (2006.01) |
| *B29D 99/00* | (2010.01) |
| *B29L 31/22* | (2006.01) |
| *B29L 31/30* | (2006.01) |

(52) U.S. Cl.
CPC ............ *B60K 37/02* (2013.01); *B29D 99/006* (2013.01); *B60K 35/00* (2013.01); *B29L 2031/22* (2013.01); *B29L 2031/3008* (2013.01); *B60K 2350/40* (2013.01)

(58) Field of Classification Search
CPC ......... B60K 37/04; B60K 37/02; B60K 35/00
See application file for complete search history.

(56) References Cited

U.S. PATENT DOCUMENTS

| | | | | | |
|---|---|---|---|---|---|
| 5,255,172 | A | * | 10/1993 | Brandon ................. | F21V 19/00 362/240 |
| 5,678,912 | A | * | 10/1997 | Ayres ...................... | B60K 37/02 362/23.17 |
| 6,179,429 | B1 | * | 1/2001 | Sheldon .................... | B60Q 3/64 362/23.15 |
| 6,476,320 | B1 | * | 11/2002 | Ritter ...................... | B60K 37/02 174/17 CT |
| 7,427,143 | B1 | * | 9/2008 | Coon ...................... | B60K 37/02 116/286 |
| 8,441,801 | B2 | * | 5/2013 | Kelly .................... | H05K 5/0017 361/753 |
| 2008/0101043 | A1 | * | 5/2008 | Westberg ............... | G01D 11/24 361/748 |
| 2014/0347796 | A1 | * | 11/2014 | Isquierdo ............... | B60K 35/00 361/679.01 |
| 2015/0097818 | A1 | * | 4/2015 | Blackmer ................ | B60Q 3/10 345/207 |
| 2015/0343902 | A1 | * | 12/2015 | Horton ................... | B60K 37/04 296/70 |
| 2016/0096472 | A1 | * | 4/2016 | Birman .................. | G01D 11/28 362/516 |

FOREIGN PATENT DOCUMENTS

EP    0065040 A1 * 11/1982 ............. B60K 37/02

\* cited by examiner

*Primary Examiner* — James A English (57) ABSTRACT

A display assembly for displaying vehicle operating information to an operator of a vehicle is provided. The display assembly includes at least two housing parts selected from the following: a mask, a light housing, and a back cover. The display assembly also includes at least one living hinge connecting the housing parts together. The housing parts and the living hinge(s) are unitarily formed as one piece. A method of forming a display assembly for displaying information to an operator of a vehicle is also provided, which includes unitarily forming the housing parts and hinges as one piece.

16 Claims, 9 Drawing Sheets

MOLD AND FOLD VEHICLE DISPLAY ASSEMBLY

FIELD

The present disclosure relates to vehicle instrument panels and clusters, and more specifically to a housing of an instrument cluster or display in a motor vehicle.

BACKGROUND

Vehicles include instrument panels to communicate information indicative of operation to an operator. For example, motor vehicles may include instrument panels with several gauges and dials that communicate vehicle conditions such as speed, engine rpm, temperature, and oil pressure, among other operational parameters.

An instrument panel and gauge is a functional element of a vehicle dashboard, but also contributes to the aesthetic appearance and impression of the vehicle. Light guides and multiple LEDS are typically assembled within a housing to distribute light to the face of the instrument cluster. Each LED requires electronics associated with it.

Therefore, housing assemblies are typically used hide the LEDs, circuit boards, light guides, and/or associated electronics, while allowing an aesthetically pleasing display or instrument cluster to be seen by a user. Such housing assemblies have multiple pieces that are snapped together. Each snap must line up and be properly molded, and the parts must be coordinated to fit together.

SUMMARY

A mold and fold housing assembly, or display assembly, is provided wherein two or more parts of the assembly are injection molded together unitarily as one piece along with at least one hinge connecting the parts together. The assembly is then assembled by folding the parts along the hinge. The number of parts is therefore reduced. The assembly may be snapped together after folding. Fewer snaps may also be used, if desired, than in the convention multi-part assemblies.

In one form, which may be combined with or separate from the other forms disclosed herein, an instrument cluster assembly for displaying vehicle operating information to an operator of a vehicle is provided. The instrument cluster assembly includes a cluster mask, a light housing, a back cover, and a multiple living hinges. The living hinges couple the cluster mask, the light housing, and the back cover together. The cluster mask, the light housing, the back cover, and the living hinges are unitarily formed as one piece.

In another form, which may be combined with or separate from the other forms disclosed herein, a display assembly for displaying vehicle operating information to an operator of a vehicle is provided. The display assembly includes at least two housing parts selected from the following: a mask, a light housing, and a back cover. At least one living hinge connects the housing parts together. The housing parts and the living hinge(s) are unitarily formed as one piece.

In yet another form, which may be combined with or separate from the other forms described herein, a method of forming a display assembly for displaying information to an operator of a vehicle is provided. The method includes injection molding unitarily as one piece the following: a plurality of housing parts and at least one living hinge connecting the housing parts together. The housing parts are selected from the following group: a mask, a light housing, and a back cover.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1A:
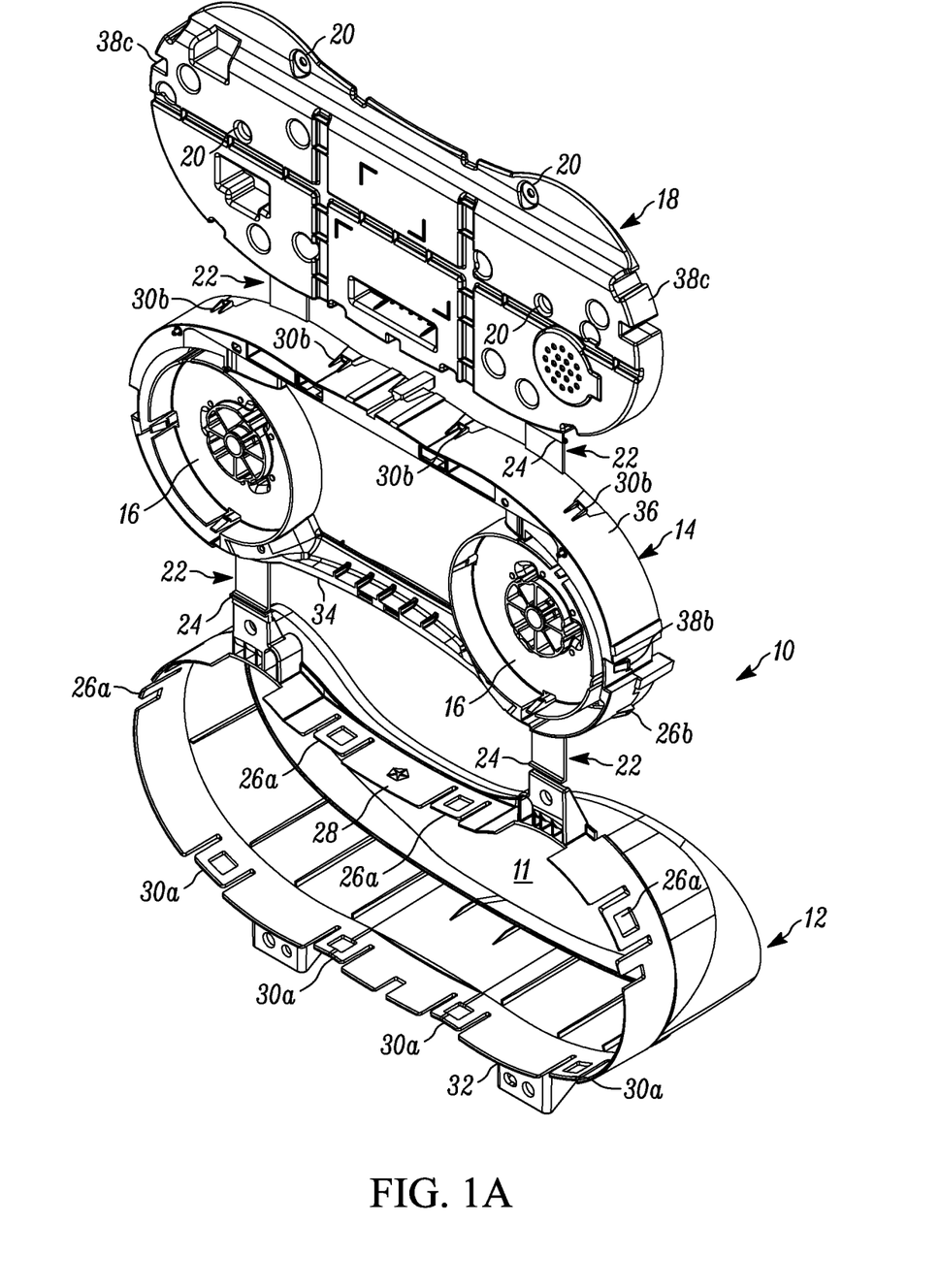
FIG. 1A is a perspective view of an example display assembly of an instrument cluster in an unfolded position, in accordance with the principles of the present disclosure.
Figure 1B:
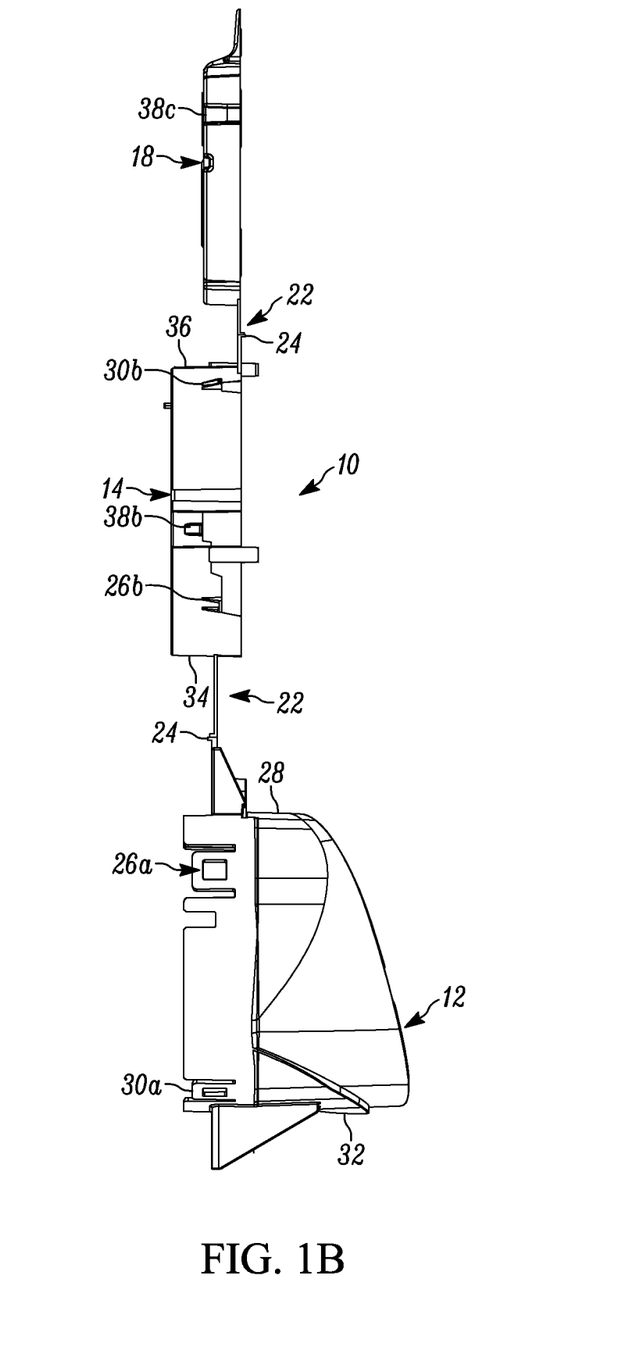
FIG. 1B is a side view of the display assembly of FIG. 1 in the unfolded position, according to the principles of the present disclosure.

With reference to FIG. 1, a disassembled, unfolded display assembly in accordance with the present disclosure is illustrated and generally designated at 10. In this example, the display assembly 10 is an instrument cluster assembly. Thus, the display assembly 10 may be used in a motor vehicle, for example, to display certain operating parameters to a driver. Information given by the instrument cluster assembly 10 may include, by way of example, tachometer information, vehicle speed information, fuel level information, engine temperature, or any other information that is desired to communicate to the driver of the vehicle.

The display assembly 10 includes a cluster mask 12 which is a housing part that normally forms a border for the instrument clusters (not shown). The cluster mask 12 may help trap light from the instrument clusters within the display assembly 10. The cluster mask 12 defines an opening 11 through which instrument clusters (not shown) may be viewed.

The display assembly 10 also includes a light housing 14. Similar to the cluster mask 12, the light housing 14 helps to trap light behind the instrument clusters and to provide a place to hide electronics and light sources. The light housing 14 has two mounting portions 16 for mounting two instrument clusters (not shown) in the display assembly 10.

The display assembly 10 also has a back cover 18. The back cover 18 is used to cover the back of the instrument clusters and to hide the circuit board(s) and other circuitry, as well as to provide mounting structures 20 for attaching the display assembly 10 within the vehicle.

Living hinges 22 are used to connect the cluster mask 12 to the light housing 14, and living hinges 22 are also used to connect the light housing 14 to the back cover 18. Thus, the living hinges 22 couple the cluster mask 12, the light housing 14, and the back cover 18 together. In this example, two living hinges 22 are used to connect the cluster mask 12 to the light housing 14, and two other living hinges 22 are used to connect the light housing 14 to the back cover 18; however, it should be understood that a greater number of living hinges 22 could be used, or merely one living hinge 22 could be used to connect each of the housing parts 12, 14, 18 to each other.

Further, it should be understood, that although three housing parts (mask 12, light housing 14, and back cover 18) are illustrated in this example, more or fewer housing parts could be used. For example, in other embodiments, the display assembly 10 could comprise only the mask 12 and the light housing 14, without the back cover 18. Or, the light housing 14 and the back cover 18 could be used, with no mask 12, by way of example.

As can be seen in the drawings, the cluster mask 12, the light housing 14, the back cover 18, and the living hinges 22 are unitarily formed as one piece. They may be injection molded plastic and molded as a single part, as shown. The display assembly 10 is therefore all one piece, as shown in FIG. 1. The display assembly 10 is preferably formed of an opaque plastic, such as polypropylene; however, any other suitable opaque material could be used, or a translucent or transparent material could be used. Such opaque material assists with trapping light and hiding components.

Figure 2:
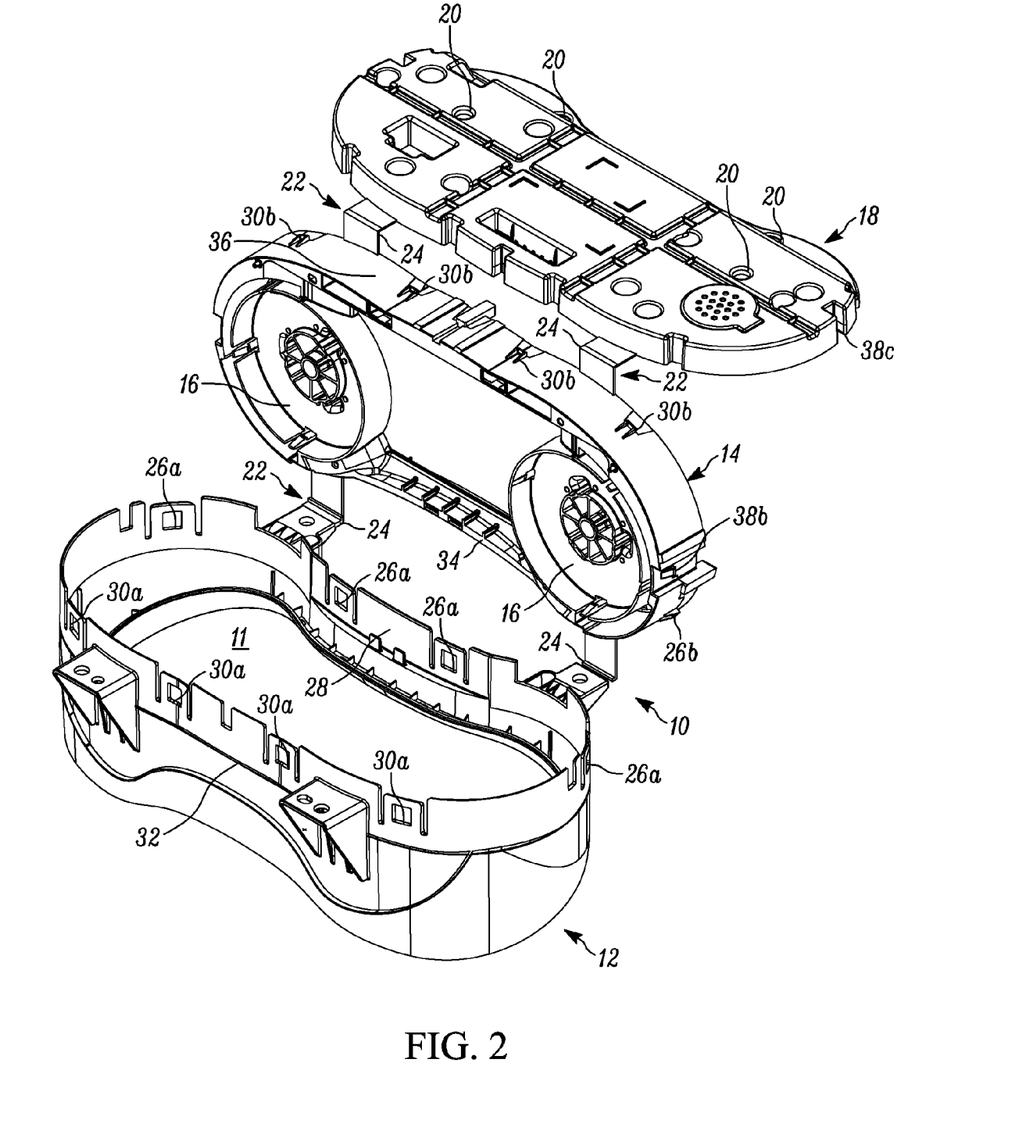
FIG. 2 is a perspective view of the display assembly of FIG. 1 in a partially folded position, according to the principles of the present disclosure.

After the display assembly 10 is formed as one piece by injection molding, the display assembly then needs to be assembled. Each of the living hinges 22 has a hinge line 24 along which the display assembly 10 is folded, as shown in FIG. 2. FIG. 2 shows the display assembly 10 in a partially folded position, with the living hinges 22 bent along the hinge lines 24 at about ninety degrees. Each living hinge 22 is thinner than each of the housing parts (the cluster mask 12, the light housing 14, and the back cover 18), which allows the living hinges 22 to bent along the hinge lines 24 while the housing part components 12, 14, 18 remain rigid.

Each of the housing parts (mask 12, light housing 14, and back cover 18) may be held together with a plurality of snaps. In the illustrated example, the cluster mask 12 has four cluster-housing snaps 26a, wherein each of the cluster-housing snaps 26a are disposed along a first side 28 (the edge closest to the light housing 14). Four more cluster-housing snaps 30a may be located along a second opposite side 32 (the outside edge). However, it should be understood that in some variations, one of the sets of snaps 26a, 30a could be eliminated such that no snaps 26a, 30a are located along one of the sides 28, 32. The light housing 14 has corresponding sets of cluster-housing snaps 26b, 30b that mate with each of the cluster-housing snaps 26a, 30a of the mask 12. Thus, each of the cluster-housing snaps 26b is disposed along a first side 34 (the bottom edge) of the light housing 14, and each of the cluster-housing snaps 30b may be located along a second side 36 (the top edge). However, it should be understood that in some variations, one of the sets of snaps 26b, 30b could be eliminated such that no snaps 26b, 30b are located along one of the sides 34, 36.

Similarly, the back cover 18 has one or more housing cover snaps 38c wherein disposed along an edge the back cover 18. The light housing 14 has a corresponding set of housing-cover snaps 38b that mate with each of the housing-cover snaps 38c of the back cover 18. Thus, each of the housing-cover snaps 38b is disposed along an edge of the light housing 14.

It should be understood, however, that any other suitable placement of the snaps 26a, 30a, 26b, 30b, 38b, 38c could be used, and that a greater number or a lesser number of snaps 26a, 30a, 26b, 30b, 38b, 38c could be used. Generally, a lesser number of snaps are used than would be if the housing parts 12, 14, 18 were separate pieces, such as in a conventional display assembly. In the illustrated example, the cluster-housing snaps 26a, 30a of the mask 12 are tabs having apertures and the cluster-housing snaps 26b, 30b of the light housing 14 are protrusions that fit through the apertures of the tabs of the mask's cluster-housing snaps 26a, 30a. The housing-cover snaps 38b of the light housing 14 are also protrusions, and these are configured to mate with the housing-cover snaps 38c of the back cover 18. The housing cover-snap 38c of the back cover 18 is illustrated as an indentation, in this example.

Figure 3:
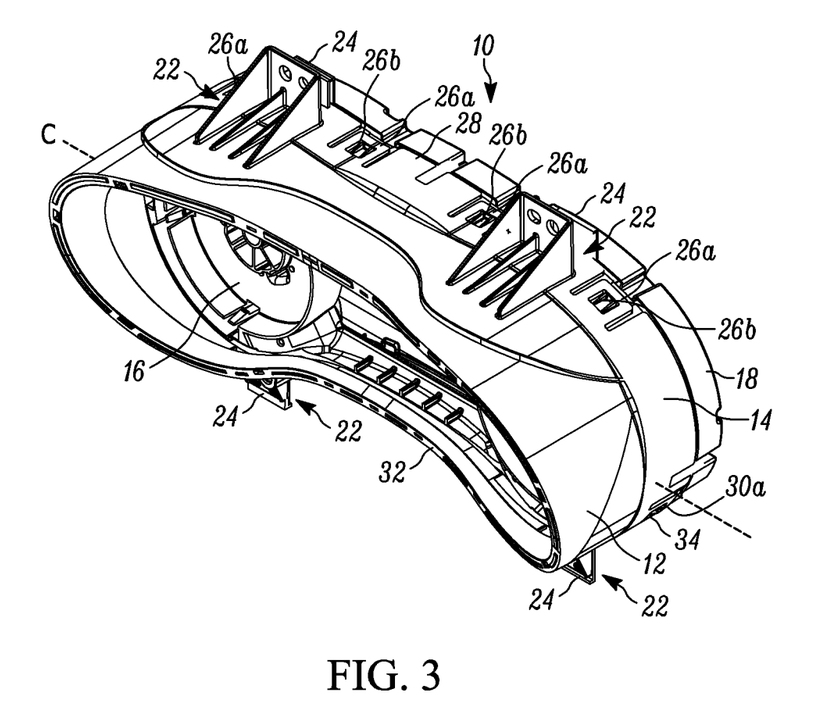
FIG. 3 is a perspective top view of the display assembly of FIGS. 1A-2 in a fully folded and assembled position, in accordance with the principles of the present disclosure.

Referring now to FIGS. 2-3, each living hinge 22 is configured to be folded along its respective fold line 24. FIG. 2 shows the assembly 10 partially folded. As can be seen in FIG. 2, the living hinges 22 are folded in opposite direction such that the assembly 10 is folded in an accordion-style, in this example. FIG. 3 shows the assembly 10 in a fully folded assembled position, with the cluster-housing snaps 26a, 26b and 30a, 30b mated together and the housing-cover snaps 38b, 38c mated together. Once the assembly 10 is fully assembled, the living hinges 22 face inwardly toward a central axis C of the assembly 10.

Figure 4A:
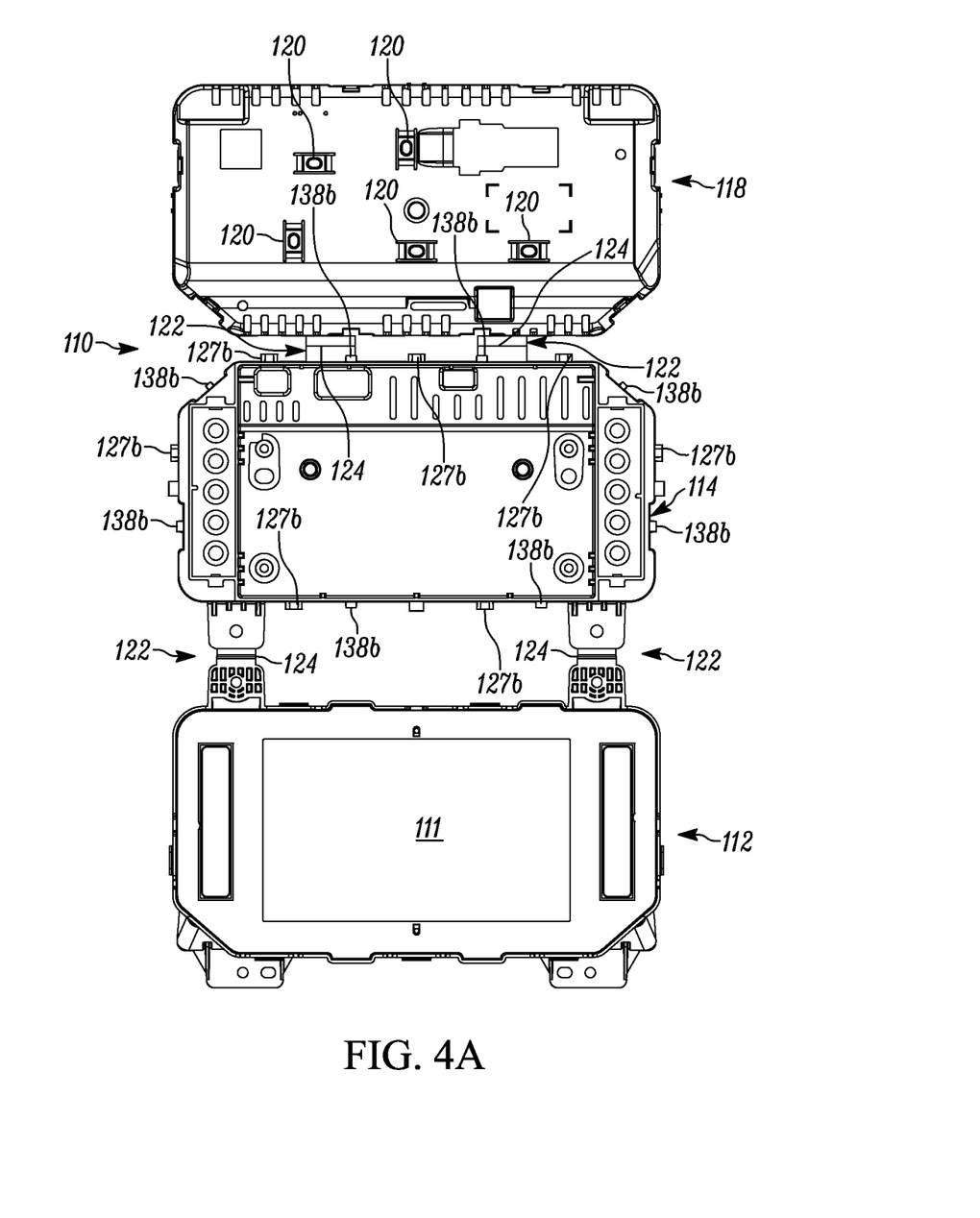
FIG. 4A is a plan view of another example display assembly in an unfolded position, according to the principles of the present disclosure.
Figure 4B:
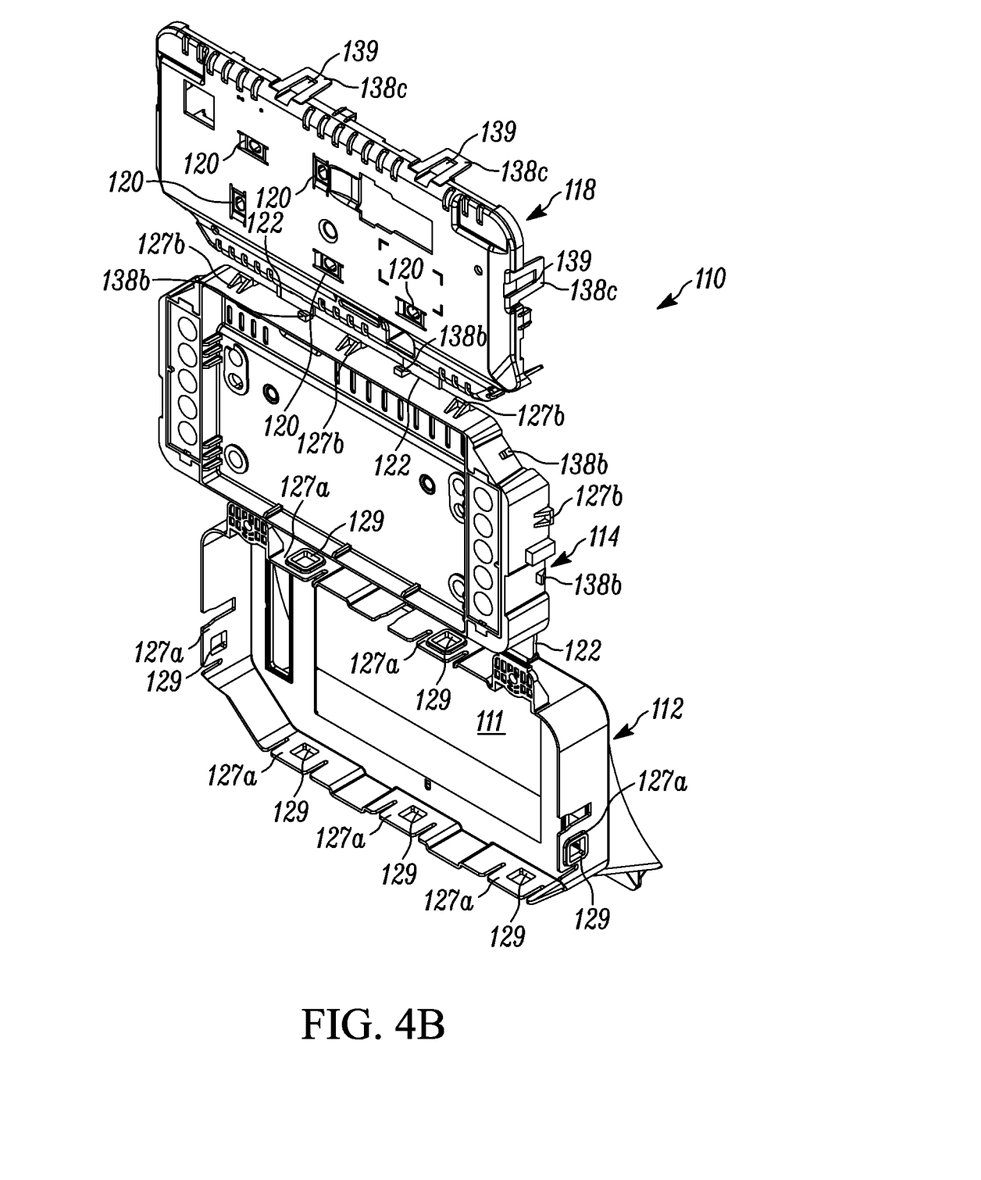
FIG. 4B is a perspective view of the display assembly of FIG. 4A in the unfolded position, in accordance with the principles of the present disclosure.

With reference to FIGS. 4A-4B, another variation of a disassembled, unfolded display assembly in accordance with the present disclosure is illustrated and generally designated at 110. In this example, the display assembly 110 is used to house a display screen, such as a TFT panel display or an LCD display. Thus, the display assembly 110 may be used in a motor vehicle, for example, to display certain operating parameters, infotainment, or navigation information to a driver.

The display assembly 110 includes a mask 112, which is a housing part that normally forms a border for the display panel (not shown). The mask 112 may help trap light from the display within the display assembly 110. The mask 112 defines an opening 111 through which a display screen (not shown) may be viewed.

The display assembly 110 also includes a light housing 114, which may be a mounting structure for the display (not shown). Similar to the mask 112, the light housing 114 helps to trap light behind the display and to provide a place to hide electronics and light sources.

The display assembly 110 also has a back cover 118. The back cover 118 is used to cover the back of the display and to hide the circuit board(s) and other circuitry, as well as to provide mounting structures 120 for attaching the display assembly 110 within the vehicle.

Living hinges 122 are used to connect the mask 112 to the light housing 114, and living hinges 122 are also used to connect the light housing 114 to the back cover 118. Thus, the living hinges 122 couple the mask 112, the light housing 114, and the back cover 118 together. In this example, two living hinges 122 are used to connect the mask 112 to the light housing 114, and two other living hinges 122 are used to connect the light housing 114 to the back cover 118; however, it should be understood that a greater number of living hinges 122 could be used, or merely one living hinge 122 could be used to connect each of the housing parts 112, 114, 118.

Further, it should be understood, that although three housing parts (mask 112, light housing 114, and back cover 118) are illustrated in this example, more or fewer housing parts could be used. For example, in other embodiments, the display assembly 110 could comprise only the mask 112 and the light housing 114, without the back cover 118. Or, the light housing 114 and the back cover 118 could be used, with no mask 112, by way of example.

As can be seen in the drawings, the mask 112, the light housing 114, the back cover 118, and the living hinges 122 are unitarily formed as one piece. They may be injection molded plastic and molded as a single part, as shown. The display assembly 110 is therefore all one piece, as shown in FIGS. 4A-4B. The display assembly 110 is preferably formed of an opaque plastic, such as polypropylene; however, any other suitable opaque material could be used, or a translucent or transparent material. Such opaque material assists with trapping light and hiding components.

Figure 5A:
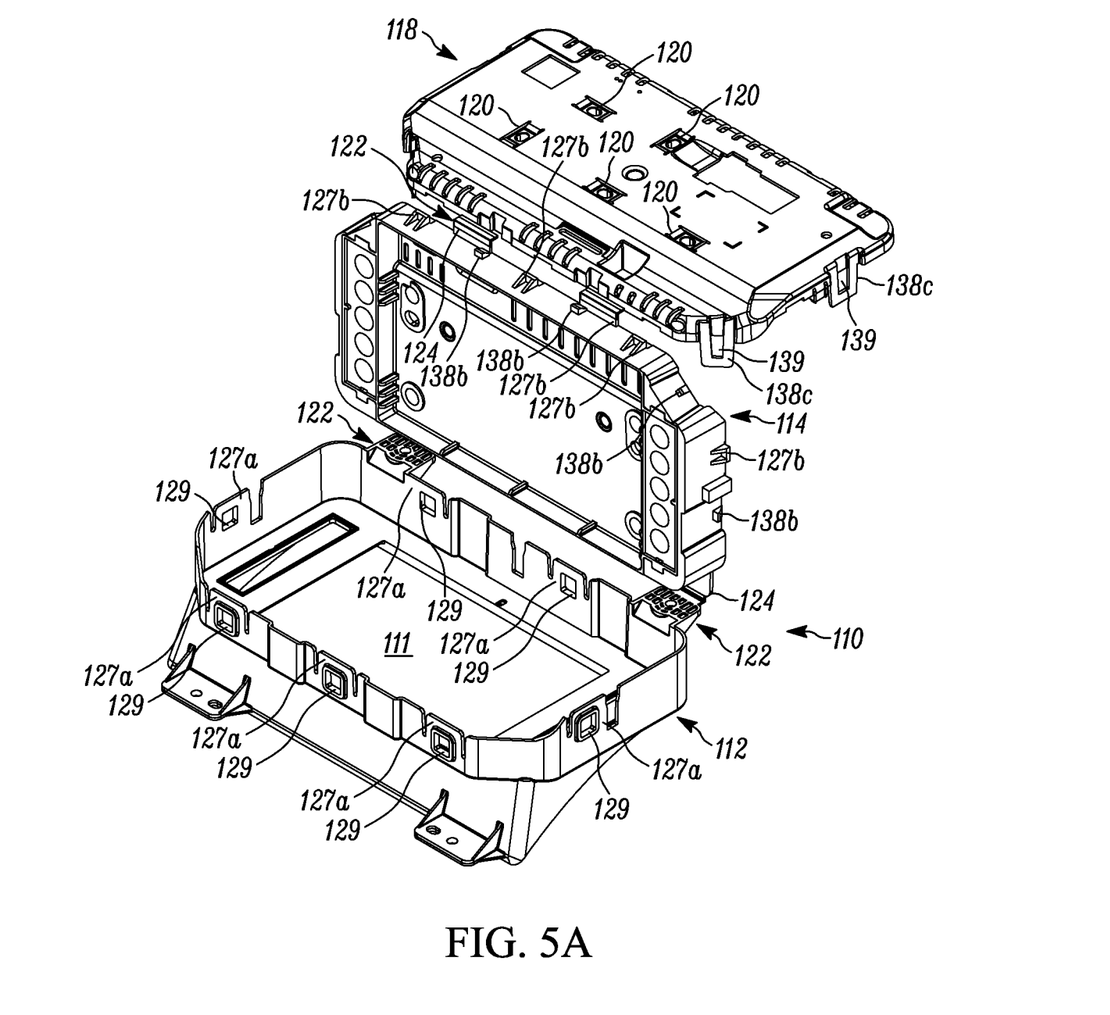
FIG. 5A is a perspective view of the display assembly of FIGS. 4A-4B in a partially folded position, according to the principles of the present disclosure.
Figure 5B:
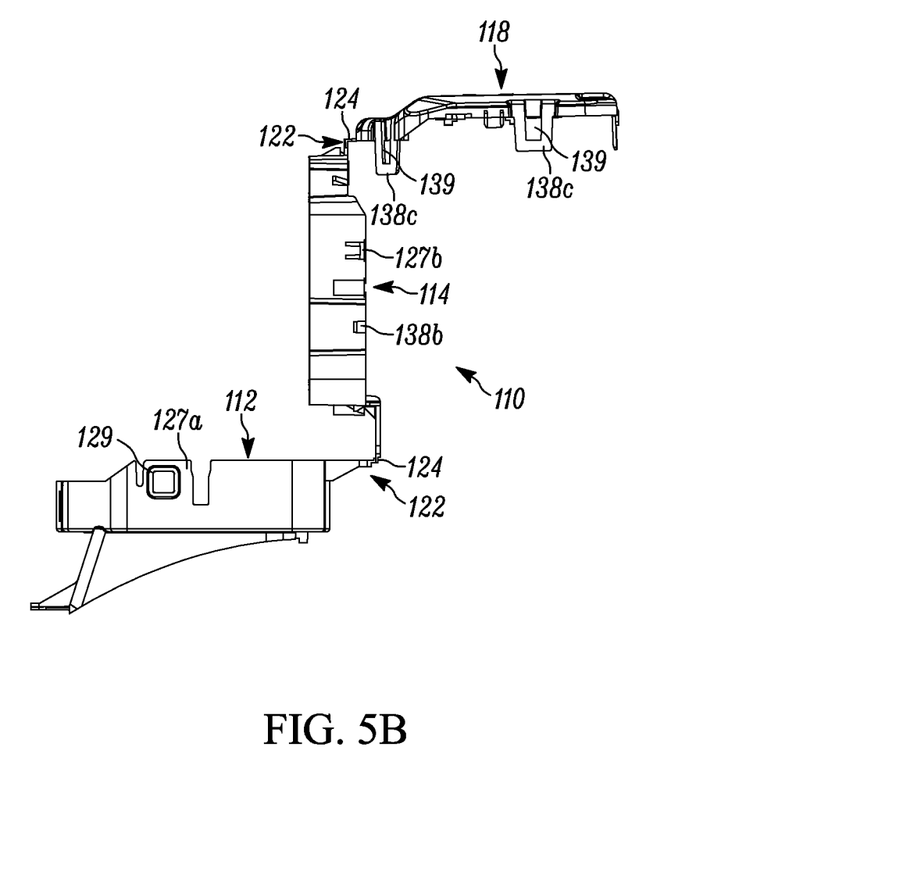
FIG. 5B is a side view of the display assembly of FIGS. 4A, 4B, and 5A in the partially folded position of FIG. 5A, in accordance with the principles of the present disclosure.

After the display assembly 110 is formed as one piece by injection molding, the display assembly 110 then needs to be assembled. Each of the living hinges 122 has a hinge line 124 along which the display assembly 110 is folded, as shown in FIGS. 4A, 5A, and 5B. FIGS. 5A-5B show the display assembly 110 in a partially folded position, with the living hinges 122 bent along the hinge lines 124 at about ninety degrees. Each living hinge 122 is thinner than each of the housing parts (the mask 112, the light housing 114, and the back cover 118), which allows the living hinges 122 to bend along the hinge lines 124.

Each of the housing parts (mask 112, light housing 114, and back cover 118) may be held together with a plurality of snaps, if desired. In the illustrated example, the mask 112 has seven total mask-housing snaps 127a, which are illustrated as tabs having apertures 129 formed therethrough. The light housing 114 has corresponding sets of mask-housing snaps 127b that mate with each of the mask-housing snaps 127a of the mask 112. However, it should be understood that in some variations, some of the mask-housing snaps 127a, 127b could be eliminated so that there could be fewer mask-housing snaps assemblies 127a, 127b. The mask-housing snaps 127b of the light housing 114 are protrusions that mate with the apertures 129 of the mask-housing snaps 127a of the mask 112.

Similarly, the back cover 118 has six total housing cover snaps 138c, which are illustrated as tabs having apertures 139 therethrough. The light housing 114 has corresponding sets of housing-cover snaps 138b that mate with each of the housing-cover snaps 138c of the back cover 118. However, it should be understood that in some variations, some of the housing-cover snaps 138b, 138c could be eliminated so that there are fewer housing-cover snaps assemblies 138b, 138c. The housing-cover snaps 138b of the light housing 114 are protrusions that mate with the apertures 139 of the housing-cover snaps 138c of the back cover 118.

It should be understood that any suitable placement of the snaps 127a, 127b, 138b, 138c could be used, and that a greater number or a lesser number of snaps 127a, 127b, 138b, 138c could be used. Generally, a lesser number of snaps are used than would be if the housing parts 112, 114, 118 were separate pieces.

Figure 6:
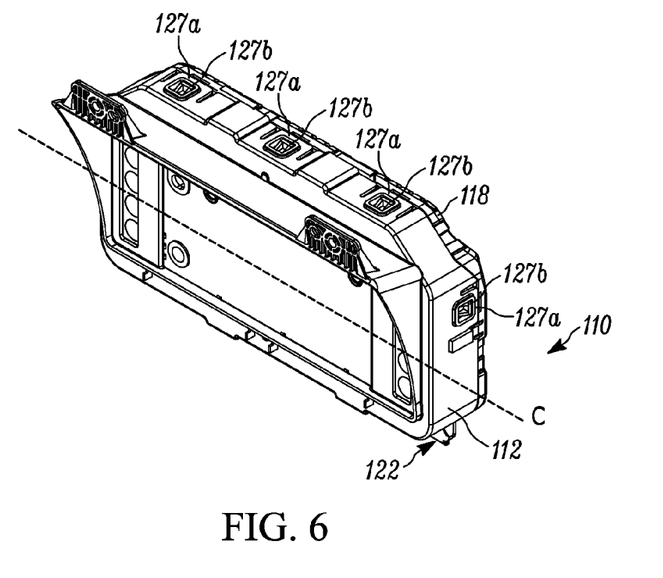
FIG. 6 is a perspective view of the display assembly of FIGS. 4A-5B in a fully folded and assembled position, in accordance with the principles of the present disclosure.

Referring now to FIGS. 5A-5B, each living hinge 122 is configured to be folded along the fold lines 124. FIGS. 5A-5B show the assembly 110 partially folded. As can be seen in FIGS. 5A-5B, the living hinges 122 are folded in opposite direction such that the assembly 110 is folded in an accordion-style, in this example. FIG. 6 shows the assembly 110 in a fully folded assembled position, with the mask-housing snaps 127a, 127b mated together and the housing-cover snaps 138b, 138c mated together. Once the assembly 110 is fully assembled, the living hinges 122 face inwardly toward a central axis C of the assembly 110.

Figure 7:
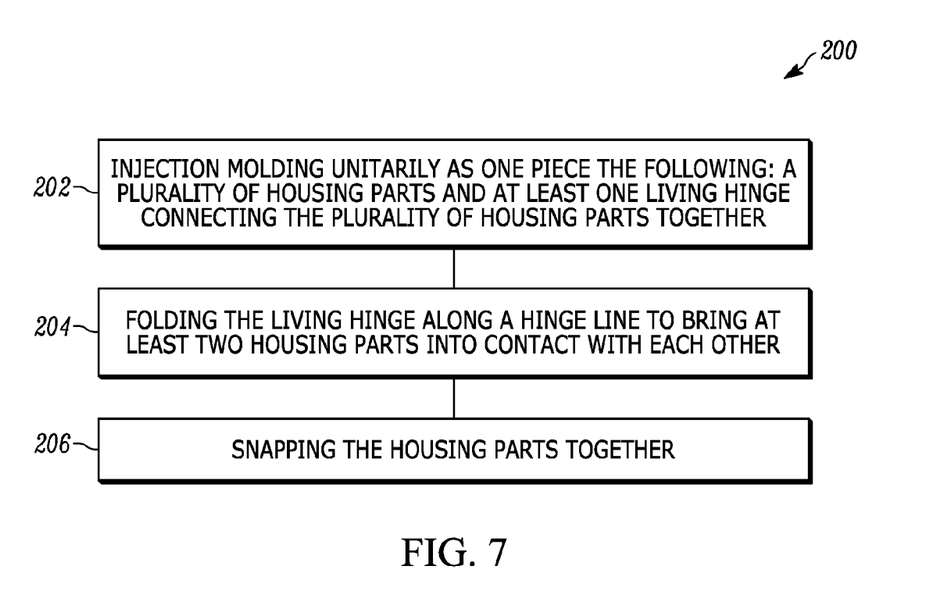
FIG. 7 is a block diagram illustrating a method of forming a display assembly for displaying information to an operator of a vehicle, according to the principles of the present disclosure.

Referring now to FIG. 7, a method of forming a display assembly for displaying information to an operator of a vehicle is illustrated in a block diagram and generally indicated at 200. The method 200 includes a step 202 of injection molding unitarily as one piece the following: a plurality of housing parts and at least one living hinge connecting the plurality of housing parts together. The plurality of housing parts is selected from the group consisting of: a mask, a light housing, and a back cover, such as the housing parts 12, 14, 18, 112, 114, 118 shown and described above. However, it should be understand that any two of the housing parts 12, 14, 18, 112, 114, 118 or other housing parts not shown could be made in step 202.

The method 200 may further include a step 204 of folding the living hinge along a hinge line to bring at least two housing parts of the plurality of housing parts into contact with each other. The method 200 may then include a step 206 of snapping the two or more housing parts together. In some forms, all three of the mask 12, 112, the light housing 14, 114, and the back cover 18, 118 are made and snapped together.

It is further understood that any of the above described concepts can be used alone or in combination with any or all of the other above described concepts. As a person skilled in the art will readily appreciate, the above description is meant as one illustration of the principles of the invention. This description is not intended to limit the scope or application of the invention in that the invention is susceptible to modification, variation, and change, without departing from the spirit and scope of the invention, as defined in the following claims.

What is claimed is:

1. An instrument cluster assembly for displaying vehicle operating information to an operator of a vehicle, the instrument cluster assembly comprising:
   a cluster mask comprising a border defining an opening of the instrument cluster assembly;
   a light housing attachable inside the border within the opening defined by the cluster mask, the light housing including a mounting portion facing outward within the opening;
   a back cover attachable to the light housing; and
   a plurality of living hinges coupling the cluster mask, the light housing, and the back cover together,
   wherein the cluster mask, the light housing, the back cover, and the living hinges are unitarily formed as one piece.

2. The instrument cluster assembly of claim 1, wherein a first living hinge of the plurality of living hinges connects the cluster mask to the light housing, and a second living hinge of the plurality of living hinges connects the light housing to the back cover.

3. The instrument cluster assembly of claim 2, each living hinge of the plurality of living hinges being thinner than the cluster mask, each living hinge of the plurality of living hinges being thinner than the light housing, and each living hinge of the plurality of living hinges being thinner than the back cover.

4. The instrument cluster assembly of claim 3, further comprising a plurality of snaps to connect the cluster mask, the light housing, and the back cover together in an assembled position.

5. The instrument cluster assembly of claim 4, the instrument cluster assembly being formed of plastic.

6. The instrument cluster assembly of claim 5, the cluster mask, the light housing, the back cover, and the plurality of living hinges being formed as one piece by injection molding.

7. The instrument cluster assembly of claim 6, wherein each living hinge is configured to be folded along a fold line, the inside of the hinge facing inward toward the instrument cluster assembly.

8. The instrument cluster assembly of claim 7, wherein a third living hinge of the plurality of living hinges connects the cluster mask to the light housing, and a fourth living hinge of the plurality of living hinges connects the light housing to the back cover.

9. The instrument cluster assembly of claim 4, the plurality of snaps comprising a plurality of cluster-housing snaps and a plurality of housing-cover snaps, the cluster mask having at least one cluster-housing snap of the plurality of cluster-housing snaps, the light housing having at least one cluster-housing snap of the plurality of cluster-housing snaps and at least one housing-cover snap of the plurality of housing-cover snaps, and the back cover having at least one housing-cover snap of the plurality of housing-cover snaps, the at least one cluster-housing snap of the cluster mask being configured to mate with the at least one cluster-housing snap of the light housing, and the at least one housing-cover snap of the light housing being configured to mate with the at least one housing-cover snap of the back cover.

10. The instrument cluster assembly of claim 8, wherein the cluster mask, the light housing, the back cover, and the plurality of living hinges are formed of an opaque material.

11. A display assembly for displaying vehicle operating information to an operator of a vehicle, the display assembly comprising:
   a mask, a light housing, and a back cover; and
   a first living hinge connecting the light housing to the mask and foldable along a first fold line in a first direction;
   a second living hinge connecting the light housing to a back cover and foldable along a second fold line in a second direction opposite the first direction;
   wherein the mask, light housing, back cover, first living hinge and second living hinge are unitarily formed as one piece.

12. The display assembly of claim 11, the first living hinge and second living hinge being thinner than each of the housing parts.

13. The display assembly of claim 12, each of the mask, light housing and back cover further comprising at least one snap to connect a corresponding one of the mask, light housing and back cover together in an assembled position.

14. The display assembly of claim 13, display assembly being formed of injection molded plastic.

15. The instrument cluster assembly of claim 2, wherein the first living hinge between the cluster mask and the light housing is configured to bend in a first direction and a second living hinge between the light housing and the back cover is configured to bend in a second direction opposite the first direction.

16. The instrument cluster assembly as recited in claim 3, wherein each of first living hinge and the second living hinge includes a fold line and the fold line for the first living hinge is disposed on a first side for movement of the light housing into the cluster mask in a first direction and the second living hinge disposed on a second side for movement of the back cover in a second direction opposite the first direction.

* * * * *